United States Patent
Nakajima et al.

(10) Patent No.: US 8,792,716 B2
(45) Date of Patent: Jul. 29, 2014

(54) IMAGE PROCESSING APPARATUS FOR REGION SEGMENTATION OF AN OBTAINED IMAGE

(75) Inventors: Shinichi Nakajima, Tokyo (JP); Ikuya Saito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 282 days.

(21) Appl. No.: 13/247,437

(22) Filed: Sep. 28, 2011

(65) Prior Publication Data
US 2012/0087578 A1    Apr. 12, 2012

(30) Foreign Application Priority Data

Sep. 29, 2010   (JP) ................................. 2010-218950
Sep. 26, 2011   (JP) ................................. 2011-209032

(51) Int. Cl.
*G06K 9/34*    (2006.01)

(52) U.S. Cl.
USPC ........................................................ 382/173

(58) Field of Classification Search
None
See application file for complete search history.

(56) References Cited

U.S. PATENT DOCUMENTS

| | | | | |
|---|---|---|---|---|
| 5,907,631 | A * | 5/1999 | Saitoh | 382/176 |
| 6,606,408 | B1 * | 8/2003 | Kang et al. | 382/164 |
| 7,428,331 | B2 * | 9/2008 | Bhattacharjya | 382/165 |
| 7,532,752 | B2 * | 5/2009 | Wen et al. | 382/162 |
| 7,986,831 | B2 * | 7/2011 | Nielsen | 382/164 |
| 7,995,058 | B2 * | 8/2011 | Smith et al. | 345/426 |
| 8,411,952 | B2 * | 4/2013 | Chefd'hotel et al. | 382/180 |
| 2002/0004710 | A1 * | 1/2002 | Murao | 702/167 |
| 2004/0013305 | A1 * | 1/2004 | Brandt et al. | 382/224 |
| 2005/0021318 | A1 * | 1/2005 | Inoue et al. | 703/2 |
| 2005/0134587 | A1 * | 6/2005 | Geiger et al. | 345/423 |
| 2006/0029275 | A1 * | 2/2006 | Li et al. | 382/173 |
| 2007/0025616 | A1 * | 2/2007 | Grady et al. | 382/173 |
| 2007/0133900 | A1 * | 6/2007 | Nielsen et al. | 382/282 |
| 2008/0008362 | A1 * | 1/2008 | Hu | 382/118 |
| 2008/0037870 | A1 * | 2/2008 | Knee et al. | 382/173 |
| 2008/0056572 | A1 * | 3/2008 | Nielsen | 382/173 |
| 2008/0171932 | A1 * | 7/2008 | Yan et al. | 600/410 |
| 2008/0247646 | A1 * | 10/2008 | Chefd'hotel et al. | 382/173 |
| 2008/0317308 | A1 * | 12/2008 | Wu et al. | 382/128 |
| 2009/0116728 | A1 * | 5/2009 | Agrawal et al. | 382/154 |
| 2009/0175543 | A1 * | 7/2009 | Nielsen | 382/204 |
| 2009/0284627 | A1 * | 11/2009 | Bando et al. | 348/273 |
| 2009/0310883 | A1 * | 12/2009 | Moriya | 382/274 |

(Continued)

FOREIGN PATENT DOCUMENTS

JP    A-2008-59081    3/2008

OTHER PUBLICATIONS

Felzenszwalb et al., "Efficient Graph-Based Image Segmentation," *International Journal of Computer Vision*, vol. 59, 167-181, 2004.

*Primary Examiner* — Wenpeng Chen
(74) *Attorney, Agent, or Firm* — Oliff PLC

(57) ABSTRACT

An image processing apparatus for region segmentation of an obtained image is provided. The image processing apparatus may include a detecting unit detecting, among plural fundamental regions set to an image, a fundamental region satisfying a predetermined condition as an appropriate region. The image processing apparatus may further include a specifying unit specifying adjacent states of fundamental regions excluding the appropriate region among the plural fundamental regions. The image processing apparatus may also include a region segmentation unit performing region segmentation on each component included in the image based on the adjacent states of the fundamental regions excluding the appropriate region specified by the specifying unit.

11 Claims, 5 Drawing Sheets

(56) References Cited

U.S. PATENT DOCUMENTS

| | | | |
|---|---|---|---|
| 2010/0008576 A1* | 1/2010 | Piramuthu | 382/173 |
| 2010/0277571 A1* | 11/2010 | Xu et al. | 348/47 |
| 2011/0013837 A1* | 1/2011 | Bergman et al. | 382/173 |
| 2011/0064308 A1* | 3/2011 | Stein et al. | 382/170 |
| 2011/0170768 A1* | 7/2011 | Alldrin et al. | 382/159 |
| 2011/0282581 A1* | 11/2011 | Zeng | 701/301 |

* cited by examiner

IMAGE PROCESSING APPARATUS FOR REGION SEGMENTATION OF AN OBTAINED IMAGE

CROSS REFERENCE TO THE RELATED APPLICATIONS

This application is based upon and claims the benefit of priority from Japanese Patent Application Nos. 2010-218950 and 2011-209032, each filed on Sep. 29, 2010 and Sep. 26, 2011, the entire contents of which are incorporated herein by reference.

BACKGROUND

1. Field

The present invention relates to an image processing apparatus processing a digital image and a storage medium storing an image processing program.

2. Description of the Related Art

Recently, there is proposed a technique of region segmentation of an image obtained with an imaging apparatus such as a digital camera into a region to be a foreground (hereinafter, a foreground region) such as a main subject and a region to be a background (hereinafter, a background region). This region segmentation is executed by, for example, setting a target image as an image made up of plural regions, generating a neighbor graph indicating a relation among the plural regions, and thereafter repeating judgment on whether to integrate adjacent fundamental regions or not by evaluating each edge in the neighbor graph (see Japanese Unexamined Patent Application Publication No. 2008-059081).

When photographing is performed using the above-described imaging apparatus under a backlit condition or in a dark environment, an image in which a shadow is generated in a part of the face of a subject may be obtained. When the above-described technique of region segmentation is used for such an image, even for regions such that both adjacent regions are skin for example, if either of the regions is a region to be a shadow, these regions are segmented without being integrated. That is, when the region segmentation is performed on an image in which a shadow is generated in a part of the face of a subject, the region corresponding to the shadow becomes the background region and the other regions are segmented as the foreground region.

SUMMARY

It is a proposition of the present invention to provide an image processing apparatus capable of region segmenting an obtained image appropriately into a foreground region and a background region even when a dark region such as a shadow is generated in a foreground region, and a storage medium storing an image processing program.

To solve the above-described problem, an image processing apparatus of the present invention includes a detecting unit detecting, among plural fundamental regions set to an image, a fundamental region satisfying a predetermined condition as an appropriate region, a specifying unit specifying adjacent states of fundamental regions excluding the appropriate region among the plural fundamental regions, and a region segmentation unit performing region segmentation on each component included in the image based on the adjacent states of the fundamental regions excluding the appropriate region specified by the specifying unit.

Further, preferably, the specifying unit generates a first neighbor graph based on edge connectivity among respective nodes with the fundamental regions being set as the nodes and edge connectivity among respective nodes with the appropriate region being set as a part of edges.

Further, preferably, the detecting unit normalizes color information of a target fundamental region using color information of the entire image or a vicinity of the target fundamental region and, when a luminance value of the fundamental region after normalization is equal to or lower than a preset threshold, detects this fundamental region having the luminance value equal to or lower than the preset threshold as the appropriate region.

Further, preferably, the specifying unit generates a second neighbor graph by edge connectivity among respective nodes with the fundamental regions being set as the nodes before detection of the appropriate region by the detecting unit and generates the first neighbor graph based on the generated second neighbor graph and a detection result of the appropriate region detected by the detecting unit.

Further, preferably, the apparatus further includes a region setting unit setting the plural fundamental regions by segmenting the image.

In this case, preferably, the region setting unit sets the plural fundamental regions in units of pixels forming the image.

Further, a storage medium storing an image processing program of the present invention is one storing an image processing program causing a computer to execute a detecting step of detecting, among plural fundamental regions set to an image, a fundamental region satisfying a predetermined condition as an appropriate region, a specifying step of specifying adjacent states of fundamental regions excluding the appropriate region among the plural fundamental regions, and a region segmenting step of performing region segmentation on each component included in the image based on the adjacent states of the fundamental regions excluding the appropriate region specified by the specifying unit.

According to the present invention, even when a dark region such as a shadow is generated in a foreground region, an obtained image can be region segmented appropriately into a foreground region and a background region.

DETAILED DESCRIPTION OF THE EMBODIMENTS

Figure 1:
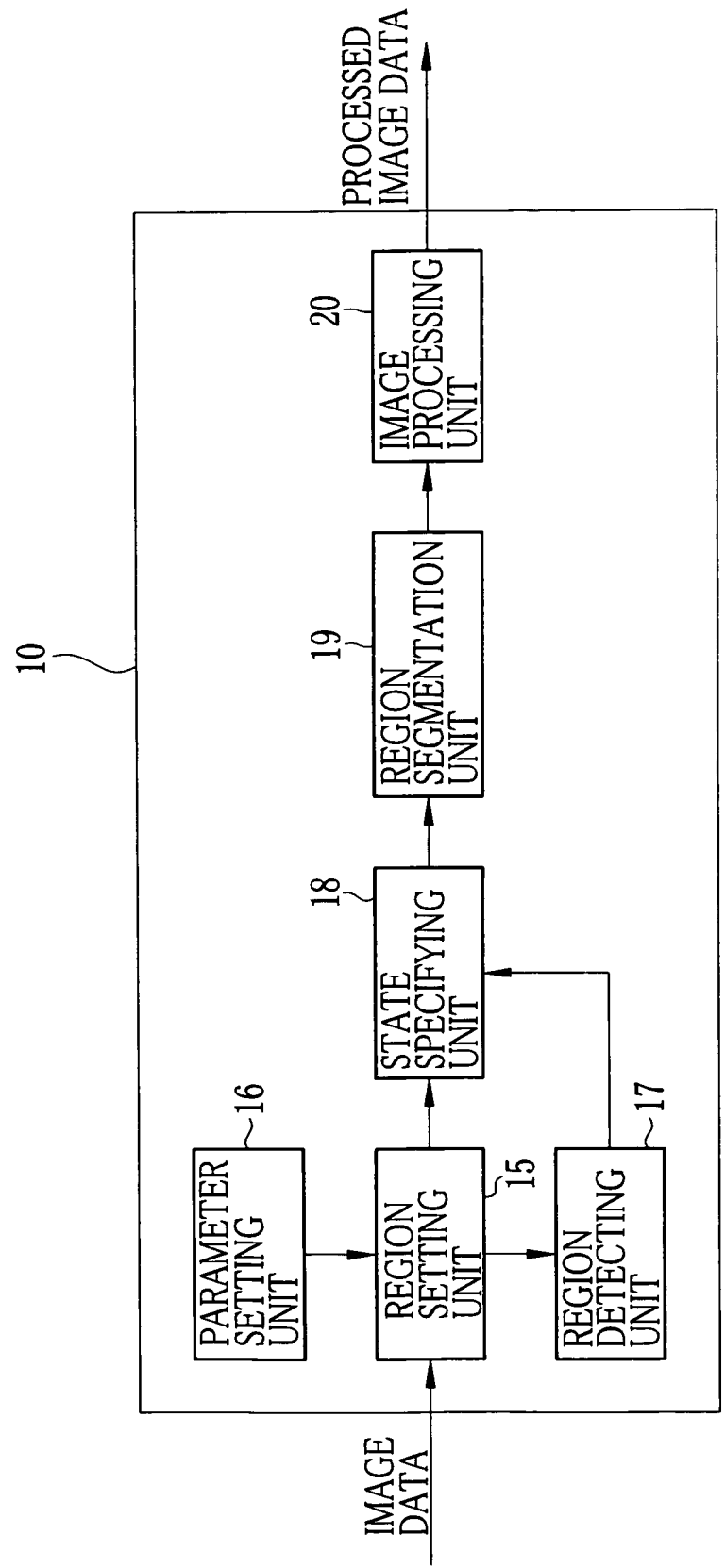
FIG. 1 is a functional block diagram illustrating a structure of an image processing apparatus of the present invention.

FIG. 1 illustrates a structure of an image processing apparatus of the present invention. This image processing apparatus 10 includes a region setting unit 15, a parameter setting unit 16, a region detecting unit 17, a state specifying unit 18, a region segmentation unit 19, and an image processing unit 20. As image data to be input to the image processing apparatus 10, image data represented in an RGB color space will be exemplified below.

The region setting unit 15 segments an image based on input image data into plural regions, to thereby set the image as an image made up of the plural regions. Note that processing in the state specifying unit 18 and the region segmentation unit 19, which will be described later, is executed in basic units of respective regions set in the region setting unit 15, and thus each of the plural regions set by the region setting unit 15 will be referred to as a fundamental region in the following description.

As a method for region segmenting an image into plural fundamental regions, there is a method setting as a fundamental region, for example, each of groups of pixels resulting from grouping a target pixel with a pixel having the same color information or similar color information as the target pixel among pixels adjacent to the target pixel by every preset number of pixels, and besides that, there are a method setting fundamental regions by the technique of "Efficient Graph-Based Image Segmentation" P. Felzenszwalb, D. Huttenlocher (2004), International Journal of Computer Vision, 59, 167-181, and the like. Further besides that, it is also possible to set respective pixels forming an image as fundamental regions.

The size of the fundamental regions set in this region setting unit 15 is set based on a parameter output from the parameter setting unit 16. Further, as the shape of the fundamental regions, a polygon such as a triangle or rectangle is used. Data of the set respective fundamental regions (more particularly, address data of pixels contained in the respective fundamental regions) are output to the region detecting unit 17 and the state specifying unit 18 together with image data. In addition, data of the respective fundamental regions may be data separate from the image data or may be data added to the image data.

The parameter setting unit 16 sets the parameter used in the region setting unit 15. This parameter may be, for example, a number of pixels forming a fundamental region, or an upper limit number of pixels. In addition, this parameter is a preset parameter, a parameter set based on input image data, or a parameter set by the user by operating an operating unit which is omitted from illustration. Further, when the parameter based on input image data is set, the parameter may be set based on, for example, image information obtained from image data, in other words, pixel values of respective pixels of image data, photographing conditions at the time the image data are obtained, and a structure in an image (such as the size of a subject, the number of subjects, and a layout of a subject and a background).

The region detecting unit 17 detects a fundamental region to be a dark part from the set plural fundamental regions. Here, as the fundamental region to be a dark part, there is a fundamental region with a low luminance value, such as a fundamental region to be a shadow or a fundamental region where the color of a subject becomes black. The fundamental region to be a dark part will be referred to as a dark region in the following description. For example, when the image data input to the image processing apparatus 10 are image data represented in an RGB color space, the image data represented in an RGB color space are converted into image data represented in a YCrCb color space. After this conversion, the region detecting unit 17 uses data of respective fundamental regions to calculate an average luminance value in plural fundamental regions close to a target fundamental region. In addition, when the input image data are image data represented by a luminance and a color difference, such as image data represented in a YCrCb color space, the processing of converting a color space is omitted.

The region detecting unit 17 normalize processes the target fundamental region using the calculated average luminance value. After this normalization processing, the region detecting unit 17 compares the sum of the luminance value of the target fundamental region with a preset threshold. In this comparison, when the sum of the luminance value of the target fundamental region is lower than the preset threshold, the fundamental region is detected as a dark region. In addition, in the normalization processing, the average luminance value of the entire image may be used rather than using the average luminance value of fundamental regions close to the target fundamental region. Data indicating a detection result in this region detecting unit 17 are output to the state specifying unit 18.

The state specifying unit 18 specifies respective adjacent states of fundamental regions by generating a neighbor graph based on an image to which the fundamental regions are set. As described above, image data and data of respective fundamental regions are input to the state specifying unit 18. The state specifying unit 18 uses these data to generate the neighbor graph. As commonly known, the neighbor graph is formed of plural nodes and edges coupling the nodes. In this embodiment, there is generated a neighbor graph with the respective fundamental regions set in the region setting unit 15 being nodes and sides of the respective fundamental regions being edges. Hereinafter, the case of an image P to which 10 triangle fundamental regions are set will be described.

Figure 2A:
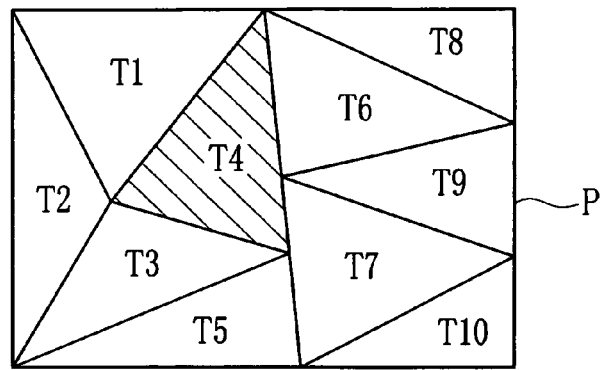
FIG. 2A is a diagram illustrating an image to which ten fundamental regions are set.
Figure 2B:
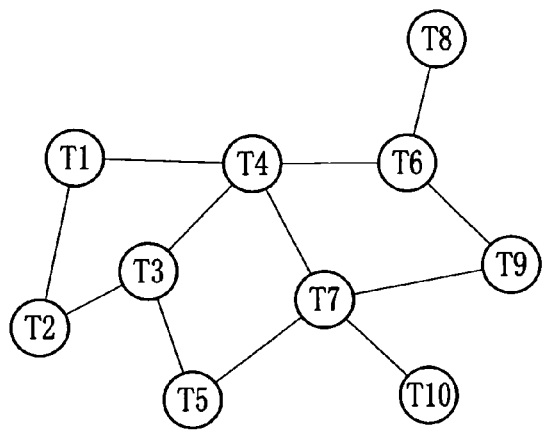
FIG. 2B is a diagram illustrating a neighbor graph generated based on the respective fundamental regions of FIG. 2A.

As illustrated in FIG. 2A, a fundamental region T1 abuts a fundamental region T2 and a fundamental region T4. Further, the fundamental region T2 abuts a fundamental region T3 besides the fundamental region T1. Further, the fundamental region T3 abuts the fundamental region T4 and a fundamental region T5 besides the fundamental region T2. Further, the fundamental region T4 abuts a fundamental region T6 and a fundamental region T7 besides the fundamental region T1 and the fundamental region T3. Further, the fundamental region T5 abuts the fundamental region T7 besides the fundamental region T3. The fundamental region T6 abuts a fundamental region T8 and a fundamental region T9 besides the fundamental region T4. The fundamental region T7 abuts the fundamental region T9 and a fundamental region T10 besides the fundamental region T4 and the fundamental region T5. Further, the fundamental region T8 abuts the fundamental region T6, the fundamental region T9 abuts the fundamental region T6 and the fundamental region T7, and the fundamental region T10 abuts the fundamental region T7. Here, the neighbor graph is generated by coupling nodes corresponding to adjacent fundamental regions by a side, in other words, an edge belonging to both the fundamental regions. Note that FIG. 2B is a neighbor graph generated based on the image P illustrated in FIG. 2A. By thus generating the neighbor graph based on respective fundamental regions set to an image, the adjacent states of the respective fundamental regions can be specified.

Figure 2C:
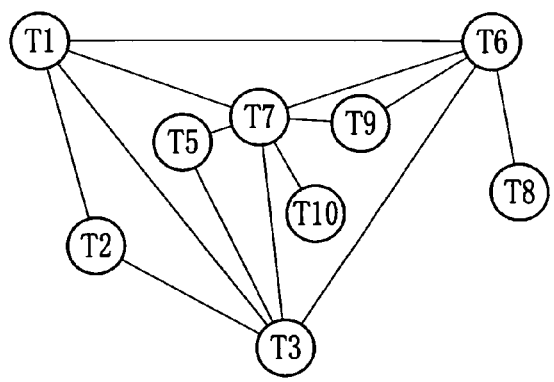
FIG. 2C is a diagram illustrating a neighbor graph when a fundamental region T4 is a dark region among the fundamental regions in FIG. 2A.

As described above, a detection result of a dark region is input from the region detecting unit 17 to this state specifying unit 18. The state specifying unit 18 refers to the neighbor graph generated based on the set fundamental regions to generate a neighbor graph based on the detection result of a dark region. As illustrated in FIG. 2A, when the fundamental region T4 becomes a dark region out of the fundamental regions T1 to T10 set to the image P, the state specifying unit 18 generates the neighbor graph assuming the fundamental region T4 as a part of edges of the nodes corresponding to the fundamental regions abutting the fundamental region T4 (in this case, the fundamental region T1, the fundamental region T3, the fundamental region T6, and the fundamental region T7). The neighbor graph when the fundamental region T4 is a dark region is as FIG. 2C. Data indicating this neighbor graph generated considering the dark region are output to the region segmentation unit 19 together with the image data and the data indicating the fundamental regions.

The region segmentation unit 19 performs region segmentation using an approach such as a graph cut method for example on the data indicating the neighbor graph output from the state specifying unit 18. Incidentally, this graph cut method is an approach to perform weighting on respective edges using luminance differences among nodes to which the above-described edges are connected, distances in a color space among nodes, and the like, and thereafter obtain a global minimization by performing minimization of a predefined energy function, to thereby region segment plural fundamental regions into a foreground region and a background region. By using this graph cut method, the plural fundamental regions set to the image are region segmented into the foreground region and the background region.

The image processing unit 20 performs image processing such as white balance processing, color-interpolation processing, contour compensation processing, gamma processing, luminance correction processing, saturation enhancement processing, and/or the like on image data in which the plural fundamental regions are region segmented into the foreground region and the background region. Here, the image processing in the image processing unit 20 is executed separately to each of the foreground region and the background region of image data. Further, processed image data on which the image processing by the image processing unit 20 is completed are output from the image processing apparatus 10. In addition, to be output from the image processing apparatus 10 is, for example, to display an image based on image data, on which the processing in the above-described units is completed, on an image display unit when a display unit omitted from illustration is provided in the image processing apparatus 10, to record the image data in a storage medium attached to the image processing apparatus when it is an image processing apparatus to/from which a storage medium can be attached/detached, or to output the image data to another connected apparatus when this image processing apparatus is connected to another apparatus.

Next, the flow of processing of the region segmentation performed on input image data will be described using a flowchart illustrated in FIG. 3. Note that this flowchart is executed, for example, upon input of image data to the image processing apparatus 10.

Step S101 is processing to set the parameter. When the processing of this step S101 is executed, the parameter setting unit 16 sets the parameter used when the above-described fundamental regions are set. In addition, this parameter setting may be executed based on an input operation by the user, or may be executed automatically.

Step S102 is processing to set fundamental regions to input image data. The region setting unit 15 uses the input image data and the parameter set in step S101 to segment an image based on the input image data into plural regions. Then, the region setting unit 15 sets the segmented plural regions as fundamental regions.

Step S103 is processing to generate a neighbor graph. By performing the processing of step S102, the plural fundamental regions are set based on the image data. The state specifying unit 18 generates the neighbor graph with the plural fundamental regions being nodes and sides of the respective fundamental regions being edges.

Step S104 is processing to detect a dark region. The region detecting unit 17 detects a dark region from the set plural fundamental regions. When the input image data are image data represented in an RGB color space, the region detecting unit 17 converts the image data into image data represented in a YCrCb color space. After this conversion, the region detecting unit 17 uses the data of the respective fundamental regions to calculate an average luminance value in plural fundamental regions close to a target fundamental region. In addition, when the input image data are image data represented by a luminance and a color difference, such as image data represented in a YCrCb color space, this processing is omitted.

The region detecting unit 17 normalize (normalize) processes the target fundamental region using the calculated average luminance value. After this normalization processing, the region detecting unit 17 compares the sum of the luminance value of the target fundamental region with a preset threshold. In this comparison, when the sum of the luminance value of the target fundamental region is lower than the preset threshold, the fundamental region is detected as a dark region.

Step S105 is processing to generate a neighbor graph using fundamental regions excluding the dark region. The state specifying unit 18 sets the dark region detected in step S104 as an edge of an adjacent fundamental region, and thereafter newly generates a neighbor graph with reference to the neighbor graph generated in step S103.

Step S106 is processing to region segment the plural fundamental regions into the foreground region and the background region. The region segmentation unit 19 performs the region segmentation on the image data using the commonly known graph cut method or the like on the neighbor graph generated in step S105. Executing this processing of step S106 results in image data in which the plural fundamental regions are region segmented into the foreground region and the background region.

Step S107 is image processing on the image data in which the plural fundamental regions are region segmented into the foreground region and the background region. The image processing unit 20 performs image processing such as white balance processing, color-interpolation processing, contour compensation processing, gamma processing, luminance correction processing, saturation enhancement processing, and/or the like on the image data on which the processing of step S106 is performed. Here, the image processing in the image processing unit 20 is executed separately to each region of the foreground region and the background region. When the processing of step S107 finishes, the image data which are image processed are output from the image processing apparatus 10.

Figure 4:
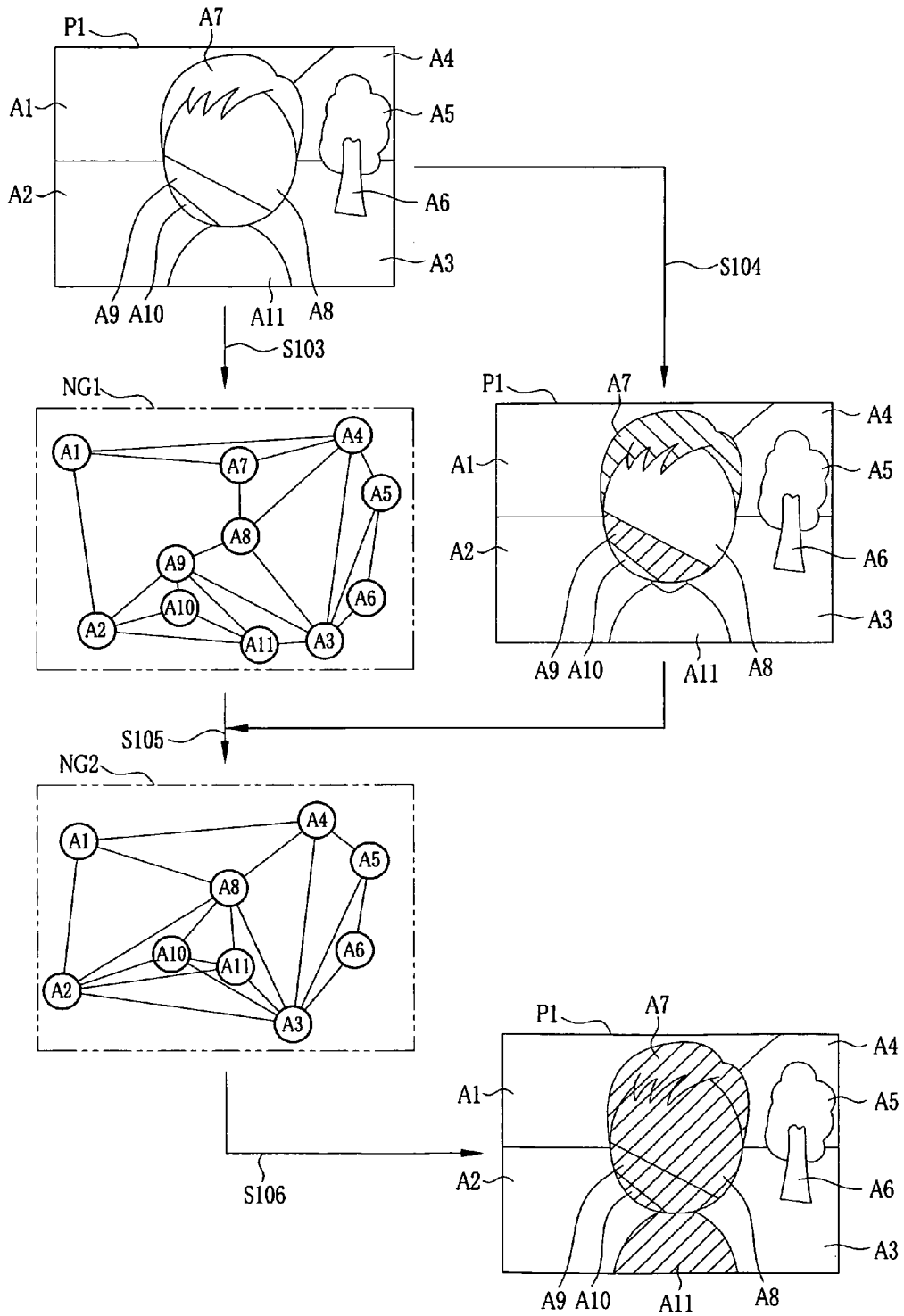
FIG. 4 is an explanatory diagram illustrating the flow of the processing of region segmentation performed on the image data.

The case where the region segmentation is performed on an image P1 obtained by photographing a portrait with views of a mountain and the like on the background will be described below. As illustrated in FIG. 4, by performing the above-described processing of step S102, the image P1 is segmented into eleven regions in total, which are a sky region A1, ground regions A2, A3, a mountain region A4, a tree leaf region A5, a stem region A6, a hair region A7 of a subject, face regions A8, A9, A10, and a clothes region A11, and these regions are set as the fundamental regions. By performing the processing of step S103 on such an image P1, a neighbor graph NG1 is generated. Thus, adjacent states in respective regions of the fundamental regions A1 to A11 are specified.

After this neighbor graph NG1 is generated, by performing the processing of step S104, a dark region is detected from the fundamental regions A1 to A11 set to the image P1. As described above, the fundamental region A7 is a hair region. Further, the fundamental region A9 is a region to be a shadow. That is, these fundamental region A7 and fundamental region A9 are regions with low luminance, and thus these fundamental region A7 and fundamental region A9 are detected as a dark region. Note that in FIG. 4, these fundamental region A7 and fundamental region A9 are described with hatching for convenience.

After the dark regions are detected, by performing the processing of step S105, a neighbor graph NG2 is generated again. Here, this neighbor graph NG2 is generated based on the generated neighbor graph NG1 and the detected dark regions. In this case, the fundamental region A7 and the fundamental region A9 as dark regions are each regarded as an edge, and thus these fundamental regions are omitted in the neighbor graph NG2.

After the neighbor graph NG2 is generated, by performing the processing of step S106, the plural fundamental regions set to the image are region segmented into the foreground region and the background region. For example, when the graph cut method is used, the smallest cut of the neighbor graph NG2 generated by the processing of step S105 is obtained. At this time, in the neighbor graph NG2, the fundamental region A8 and the fundamental region A10 are judged to be abutting via an edge. Further, the fundamental region A8 and the fundamental region A10 are both a skin region, and thus when the above-described graph cut method is used, these fundamental region A8 and fundamental region A10 become the same region (foreground region). That is, the fundamental regions A1 to A6 are segmented as the background region, and the fundamental regions A7 to A11 are segmented as the foreground region. Accordingly, even when a region to be a dark part exists in the foreground region, this dark region can be prevented from being classified as the background region, and consequently, it is possible to region segment the preset plural fundamental regions appropriately into the foreground region and the background region.

Note that in FIG. 4, the case where there is one person as a subject is described, but it need not be limited thereto. The present invention can be applied also when there are plural persons as subjects for example. Specifically, in the case of an image including plural main subjects, it is possible to region segment fundamental regions in every one of respective regions of the plural main subjects and regions to be the background, in other words, every component included in the image. In this case, when segmenting into two regions of the foreground region and the background region is performed, it is possible to obtain a distance of each subject in advance, and region segmentation into respective regions is performed based on the distances of the subjects.

In this embodiment, color image data represented in an RGB color space are given as the image data input to the image processing apparatus 10, but the image data need not be limited thereto. The image data may be color image data represented in a YCrCb color space or another color space. Further, regarding the image data, the present invention may be applied even for RAW data besides the color image data.

In this embodiment, all the fundamental regions set in an image are set as nodes and then the neighbor graph is generated, but it need not be limited thereto. It is also possible to section an image into plural regions, and then execute the processing to generate the neighbor graph and the processing to region segment in each of the sectioned regions.

In this embodiment, the dark region is set as a fundamental region satisfying a predetermined condition. However, the fundamental region satisfying a predetermined condition need not be limited to the dark region. For example, when there is a fundamental region which is much brighter than other fundamental regions, this fundamental region may be set as the fundamental region satisfying a predetermined condition. Further, like an electric cable appearing in a scene of sky, a fundamental region which is relatively darker than surrounding regions and is thin and long may be set as the fundamental region satisfying a predetermined condition. Moreover, like a window frame or blinds, a fundamental region which is straight, long and relatively darker than surrounding regions where regions on both ends of this region have similar characteristics or a fundamental region which is recognized clearly as a moving object may be set as the fundamental region satisfying a predetermined condition.

In this embodiment, the image processing apparatus performing image processing on image data in which plural fundamental regions are region segmented into the foreground region and the background region is described, but it need not be limited thereto. Whether to perform image processing on image data in which plural fundamental regions are region segmented into the foreground region and the background region may be set appropriately. For example, when only results of performing region segmentation are needed, it is possible to output them without performing the image processing in the image processing unit. Further, the apparatus may be an image processing apparatus provided with a function to trim a region-segmented foreground region and/or a function to synthesize a trimmed foreground region with another image.

In this embodiment, after a neighbor graph is generated based on fundamental regions set to input image data, the detection processing of a dark region is performed, and with reference to the generated neighbor graph, a neighbor graph in which the detected dark region is set as an edge is generated. However, it need not be limited thereto, and a dark region may be detected from fundamental regions set to image data without performing the processing to generate the neighbor graph based on fundamental regions set to input image data, and a neighbor graph in which the detected dark region is set as an edge may be generated.

Figure 5:
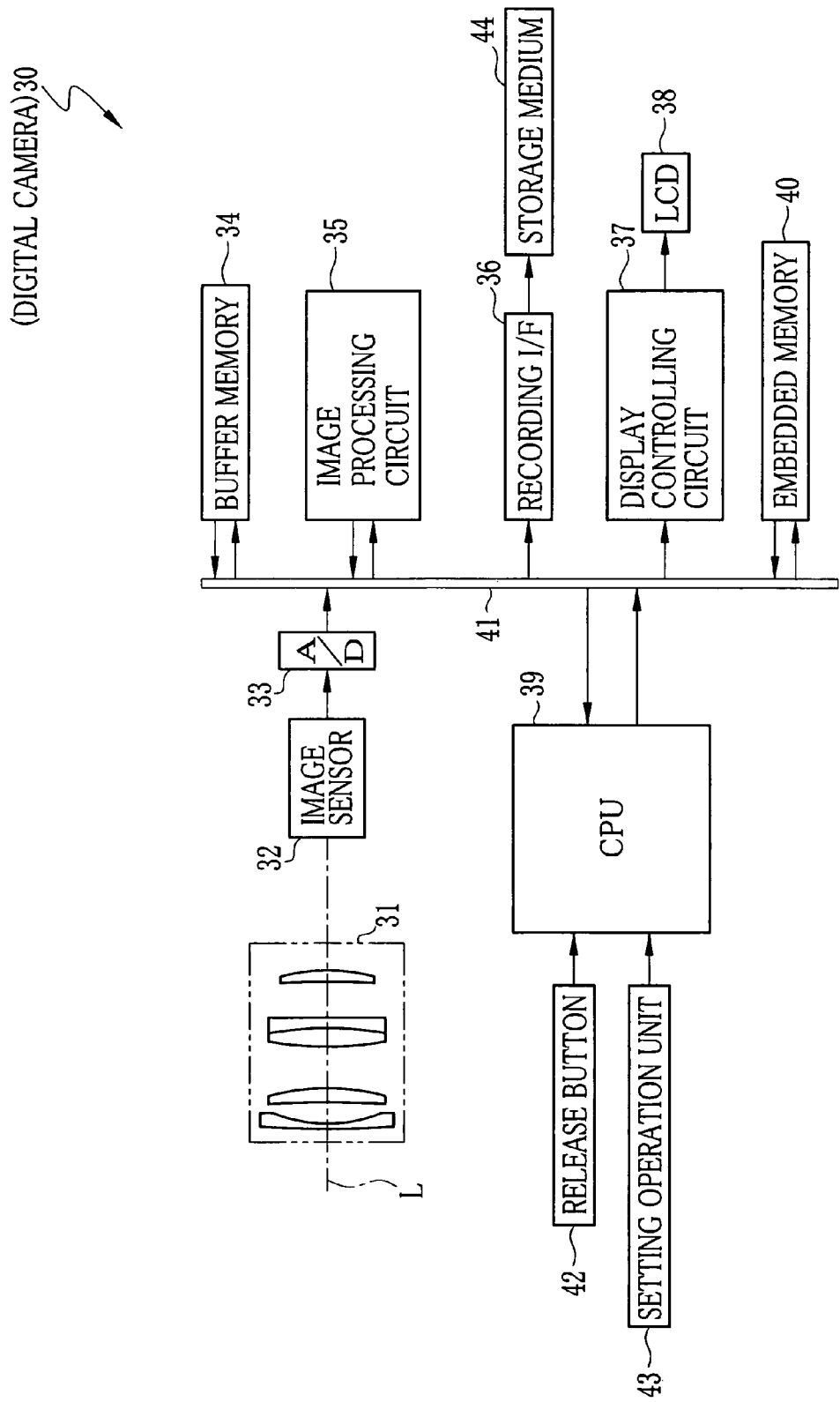
FIG. 5 is a functional block diagram illustrating an electrical structure of a digital camera.

In this embodiment, the image processing apparatus is taken as an example, but the image processing apparatus of this embodiment may be incorporated in an imaging apparatus such as a digital camera. Further, FIG. 5 is a functional block diagram illustrating an electrical structure of a digital camera. This digital camera 30 includes an imaging optical system 31, an image sensor 32, an A/D converting unit 33, a buffer memory 34, an image processing circuit 35, a recording I/F 36, a display controlling circuit 37, an LCD 38, a CPU 39, an embedded memory 40, a bus 41, a release button 42, and a setting operation unit 43. Further, this image processing circuit 35 has the functions of the region setting unit 15, the parameter setting unit 16, the region detecting unit 17, the state specifying unit 18, the region segmentation unit 19, and the image processing unit 20 in the image processing apparatus 10 described in this embodiment. In addition, in this case, the image data on which region segmentation is performed may be image data output from the image sensor 32 or may be image data stored in a storage medium 44 connected to the recording I/F 36.

In this case, similarly to this embodiment, image processing is performed on image data in which plural fundamental regions are region segmented into the foreground region and the background region, and then the data are recorded. In this case also, only the processing to region segment plural fundamental regions into the foreground region and the background region may be performed, or it is also possible to perform processing such as cutting out data based on the foreground region from the image data in which plural fundamental regions are region segmented into the foreground region and the background region, or synthesizing data based on the cut-out foreground region with other image data.

Figure 3:
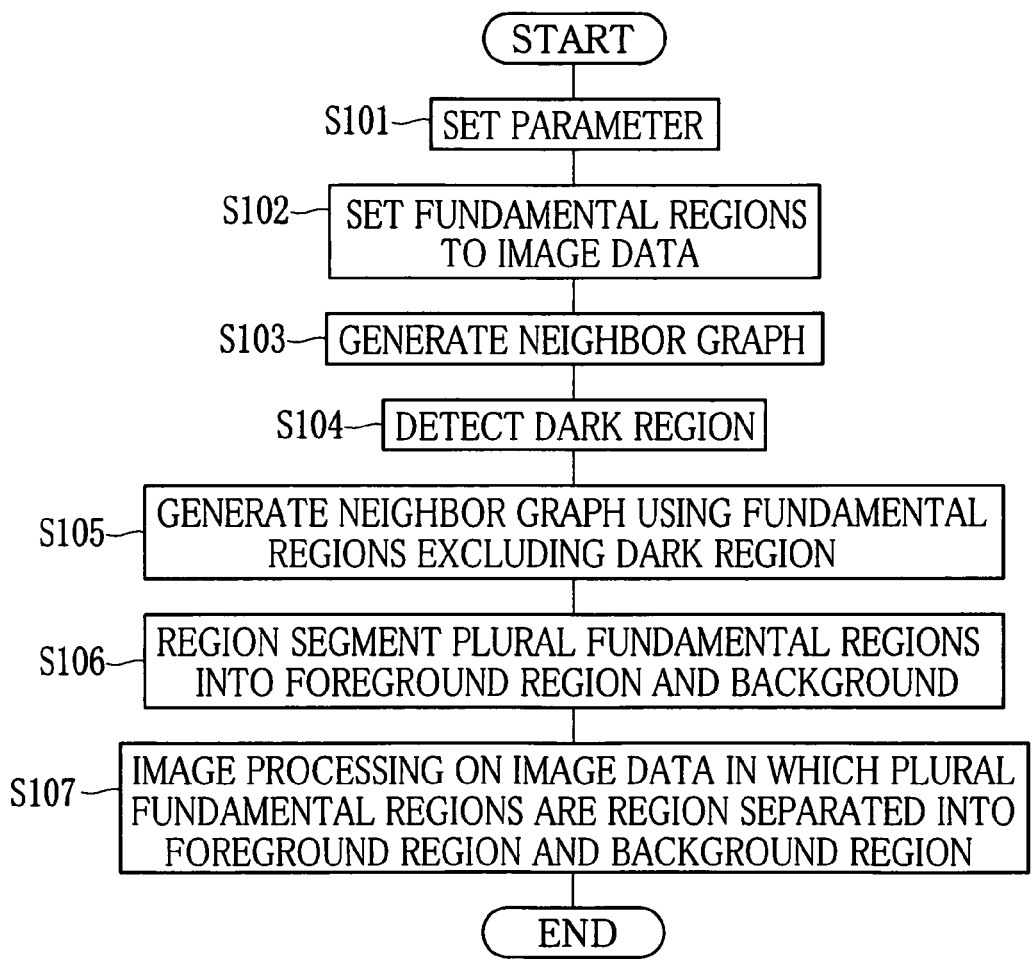
FIG. 3 is a flowchart illustrating the flow of processing of region segmentation performed on image data.

In this embodiment, the image processing apparatus 10 as an example is described, but it may be an image processing program capable of causing a computer to execute the functions of the region setting unit 15, the parameter setting unit 16, the region detecting unit 17, the state specifying unit 18, the region segmentation unit 19, and the image processing unit 20 of the image processing apparatus 10 illustrated in FIG. 1, and/or the processing of the flowchart illustrated in FIG. 3. In addition, preferably, this image program is stored in a storage medium which is readable by a computer, such as a memory card, an optical disc, or a magnetic disc for example.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
a detecting unit normalizing color information of a fundamental region to be a target, among plural fundamental regions set to an image, by using color information of a vicinity of the fundamental region to be the target or color information of an entire image and detecting the fundamental region to be the target as an appropriate region when a luminance value of the fundamental region to be the target after normalization is equal to or lower than a preset threshold;
a specifying unit specifying adjacent states of fundamental regions excluding the appropriate region among the plural fundamental regions; and
a region segmentation unit performing region segmentation on each component included in the image based on the adjacent states of the fundamental regions excluding the appropriate region specified by the specifying unit.

2. The image processing apparatus according to claim 1, wherein
the specifying unit sets the appropriate region as an edge of the fundamental region adjacent to the appropriate region and generates a first neighbor graph based on edge connectivity among respective nodes, in which the fundamental regions, among the plural fundamental regions excluding the appropriate region, are set as the nodes.

3. The image processing apparatus according to claim 2, wherein
the specifying unit generates a second neighbor graph based on edge connectivity among respective nodes, in which the plural fundamental regions to be set for the image are set as the nodes, before detection of the appropriate region by the detecting unit and generates the first neighbor graph based on the second neighbor graph being generated and a detection result of the appropriate region detected by the detecting unit.

4. The image processing apparatus according to claim 1, further comprising:
a region setting unit setting the plural fundamental regions by segmenting the image.

5. The image processing apparatus according to claim 4, wherein
the region setting unit sets the plural fundamental regions in units of pixels forming the image.

6. A non-transitory computer readable storage medium storing an image processing program causing a computer to execute:
normalizing color information of a fundamental region to be a target, among plural fundamental regions set to an image, by using color information of a vicinity of the fundamental region to be the target or color information of an entire image;
detecting the fundamental region as an appropriate region when a luminance value of the fundamental region to be the target after normalization is equal to or lower than a preset threshold;
specifying adjacent states of fundamental regions excluding the appropriate region among the plural fundamental regions; and
performing region segmentation on each component included in the image based on the adjacent states of the fundamental regions excluding the appropriate region specified by the specifying unit.

7. An image processing apparatus, comprising:
a detecting unit detecting, among plural fundamental regions set to an image, a fundamental region satisfying a predetermined condition as an appropriate region;
a specifying unit specifying adjacent states of fundamental regions excluding the appropriate region among the plural fundamental regions using a neighbor graph excluding the appropriate region; and
a region segmentation unit region segmenting each fundamental region in the image into a foreground region or background region based on the neighbor graph indicating the adjacent states of the fundamental regions excluding the appropriate region specified by the specifying unit.

8. The image processing apparatus according to claim 7, wherein
the specifying unit generates a first neighbor graph based on edge connectivity among respective nodes with the fundamental regions being set as the nodes and edge connectivity among respective nodes with the appropriate region being set as a part of edges.

9. The image processing apparatus according to claim 7, wherein
the specifying unit generates a second neighbor graph by edge connectivity among respective nodes with the fundamental regions being set as the nodes before detection of the appropriate region by the detecting unit and generates the first neighbor graph based on the second neighbor graph being generated and a detection result of the appropriate region detected by the detecting unit.

10. The image processing apparatus according to claim 7, further comprising:
a region setting unit setting the plural fundamental regions by segmenting the image.

11. The image processing apparatus according to claim 10, wherein
the region setting unit sets the plural fundamental regions in units of pixels forming the image.

* * * * *